April 2, 1968   E. C. KNIGHT   3,375,581
GRASS SHEARS
Filed April 29, 1966   2 Sheets-Sheet 1

INVENTOR.
Erwin C. Knight
BY
Attorney

April 2, 1968  E. C. KNIGHT  3,375,581
GRASS SHEARS

Filed April 29, 1966  2 Sheets-Sheet 2

INVENTOR.
Erwin C. Knight
BY
Attorney

United States Patent Office 3,375,581
Patented Apr. 2, 1968

3,375,581
GRASS SHEARS
Erwin C. Knight, Watertown, Wis., assignor to McGraw-Edison Company, Milwaukee, Wis., a corporation of Delaware
Filed Apr. 29, 1966, Ser. No. 546,436
13 Claims. (Cl. 30—248)

ABSTRACT OF THE DISCLOSURE

A grass shears having a free floating blade support which is adjustable toward and away from the fixed blade to vary the crossing angle of the cutting blades and thus the cutting characteristic of the blades, the blade support including a pin secured to the movable blade and rotatably and reciprocably mounted in a slotted mount relative to the fixed blade.

---

This invention relates to garden implements and, more particularly, to grass shears.

It is an object of the invention to provide an improved grass shears having a "free floating" movable blade and means to forcibly press the cutting edge of the movable blade against the cutting of the fixed blade at all times. A further object is to provide such a grass shears wherein the force urging the movable blade against the fixed blade increases progressively as the blades close and the tips come together. Another object of the invention is to provide such a grass shears having a free floating movable blade and wherein both the actuating link and the spring means for normally biasing the blades to open position urge the cutting edge of the movable blade toward the cutting edge of the fixed blade as the blades close. A further object of the invention is to provide such a grass shears having a free floating movable blade and means to pull the movable blade down against the fixed blade in such manner that the tougher the material being cut, the greater will be the pressure between the cutting edges of the blades. Still another object of the invention is to provide such a grass shear having means for adjusting the ease with which different types of grass are cut. A still further object is to provide such a grass shear having a free floating movable blade and means for adjusting the force with which the blades are pressed together as the movable and fixed blades close.

These and other objects and advantages of the invention will be more readily apparent from the following detailed description when considered in conjunction with the accompanying drawing wherein.

Figure 1:
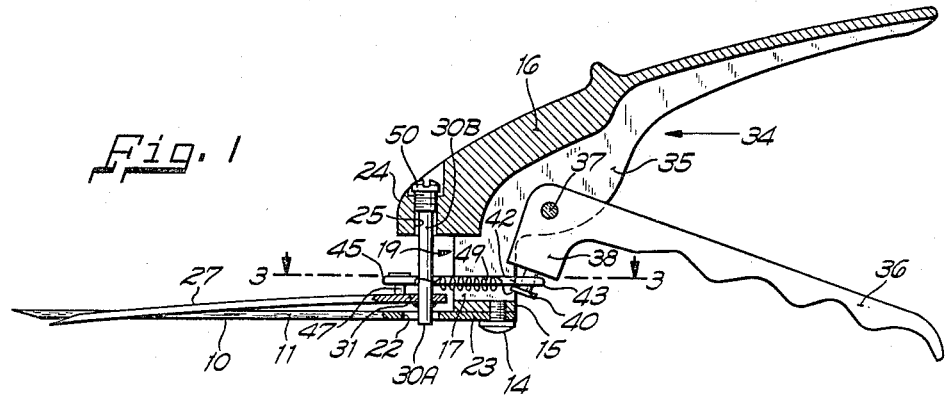
FIG. 1 is a side view, partly in section, of one embodiment of the grass shears of the invention, shown in open position.
Figure 2:
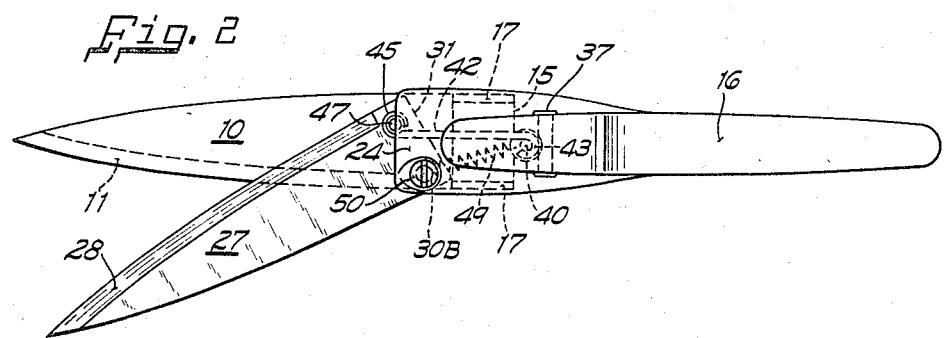
FIG. 2 is a top view of the grass shears of FIG. 1 shown in open position.
Figure 3A:
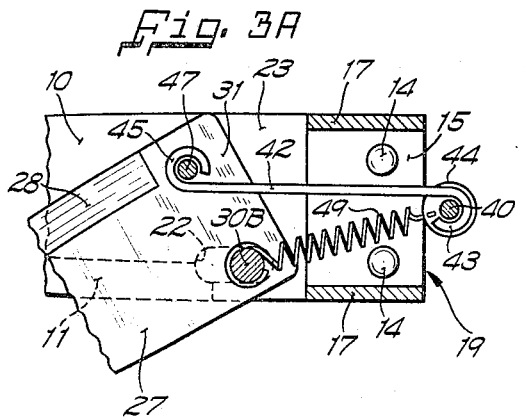
Figure 3B:
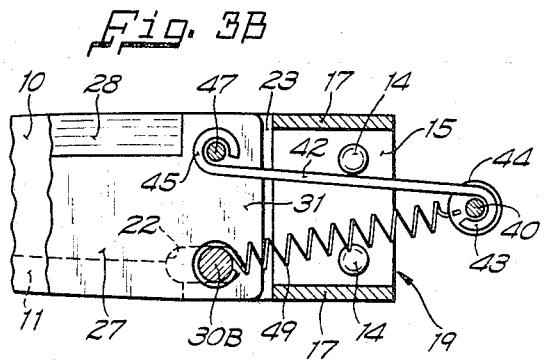
Figure 4A:
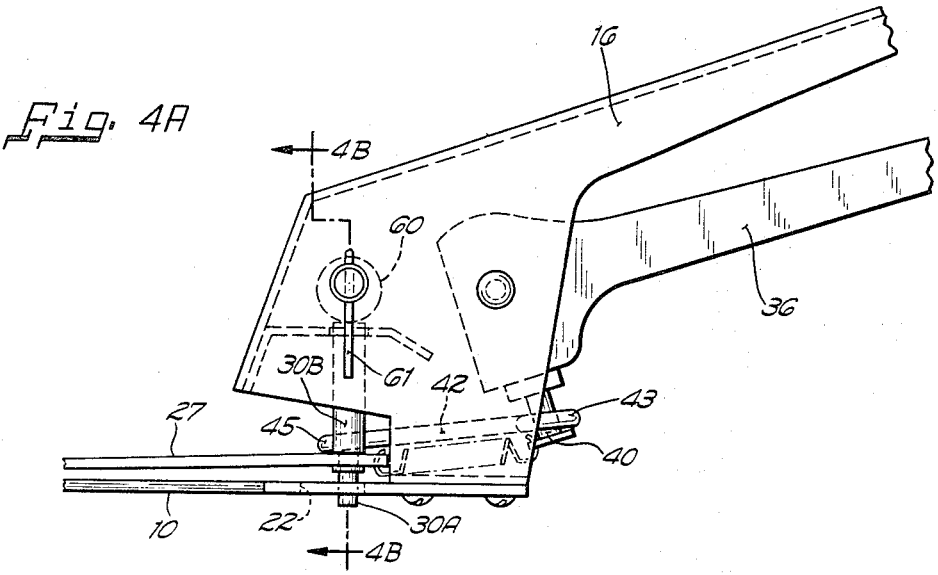
Figure 4B:
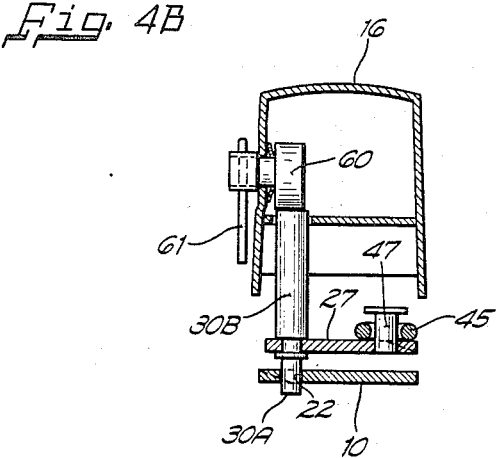

FIGS. 3A and 3B are views taken on line 3—3 of FIG. 1 in the open and closed positions of the shears, respectively; and FIGS. 4 and 4B show another embodiment of the invention wherein the blade adjusting means comprises a rotatable cam 60 instead of an adjustable thumb screw 50.

Referring to the drawing, the grass shears of the invention has a fixed bottom blade 10 having a pointed tip and a beveled cutting edge 11. The rear end of fixed blade 10 is rigidly connected by a pair of headed screws 14 (these may be rivets) to the laterally extending foot portion 15 of a rearwardly disposed stationary handle 16 having laterally spaced apart depending side portions 17 connected at their lower end by base portion 15 and forming an aperture 19 in stationary handle 16. Fixed blade 10 has an oblong slot 22 adjacent the rear end 23 and near the cutting edge 11 thereof. Stationary handle 16 has a forwardly projecting portion 24 disposed above the rear end 23 of fixed blade 10 and provided with an elongated, vertically extending tapped hole 25 registering with slot 22.

A movable blade 27 provided with a beveled cutting edge 28 is disposed above fixed blade 10 and has a fulcrum pin 30 affixed adjacent the rear end 31 thereof and near the edge opposite cutting edge 28. Fulcrum pin 30 has a depending portion 30A which extends into slot 22 and an upstanding portion 30B which is slidably telescoped within tapped hole 25. Depending fulcrum pin portion 30A moves freely in slot 22 in a direction longitudinal of fixed blade 10 but prevents movable blade 27 from tilting about the longitudinal axis of fixed blade 10. Consequently, movable blade 27 cannot rock, or tilt, sideways but is "free floating" in that it can move longitudinally of stationary blade 10 and vertically towards and away from fixed blade 10 and can also tilt about a laterally extending axis to move the tip thereof toward and away from the tip on fixed blade 10.

An elongated cavity 34 extending upwardly from the bottom surface of stationary handle 16 is partially defined by side wall portions 35 which terminate in the depending portions 17. A bell crank movable handle 36 is pivotally mounted within cavity 34 and relative to stationary handle 16 upon a headed transverse pivot pin 37 which extends through the side wall portions 35 of stationary handle 16. Movable handle 36 has a depending lever arm 38 which terminates in a reduced diameter portion 40. An actuating link 42 extending through aperture 19 in stationary handle 16 has an eye portion 43 at its rear end which fits over reduced diameter portion 40 to pivotally connect link 42 to lever arm 38 and at its forward end has an eye portion 45 which surrounds an upstanding post 47 affixed to the rear end 31 of movable blade 27 at a point spaced radially from fulcrum pin 30 and adjacent cutting edge 28 to operatively connect link 42 to the rear end of movable blade 27.

A tension spring 49 has hook-shaped ends, one of which engages the upstanding portion 30B of fulcrum pin 30 and the other of which is engaged within an aperture provided in a headed portion 44 at the end of depending lever arm 38 to operatively connect spring 49 to depending lever arm 38. Spring 49 actuates movable blade 27 through actuating link 42 to normally bias the fixed and movable handles 16 and 36 apart and the fixed and movable blades 10 and 27 to open position.

An adjusting thumb screw 50 engaged within tapped hole 25 permits axial displacement of the upstanding portion 30B of fulcrum pin 30 to actuate the rear end 31 of movable blade 27 toward the fixed blade 10 and thereby adjust the ease with which different types of grass can be cut.

Squeezing the stationary and movable handles 16 and 36 together by the operator actuates lever arm 38 and link 42 in a rearward direction rotates movable blade 27 about fulcrum pin 30 to close the fixed and movable blades 10 and 27, and it simultaneously urges movable blade 27 to tilt the plane thereof about a lateral axis and in a direction to move the tip thereon toward the tip on fixed blade 10. Link 42 exerts a force through post 47 on the rear end of movable blade 27 which tilts the tip of movable blade 27 toward the tip on fixed blade 10 and presses the beveled cutting edges 11 and 28 together as the blades 10 and 27 close. Link 42 thus effects a simultaneous forward tilting and pivoting compound motion of movable blade 27. The depending portion 30A of fulcrum pin 30 moving in slot 22 maintains the movable blade 27 level, i.e., prevents tilting thereof about its longitudinal axis, even though movable blade 27 is moved in a longitudinal direction and the plane thereof tilted about a lateral axis relative to fixed blade 10. The upstanding portion 30B of fulcrum pin 30 extending into tapped hole 25 prevents movement of the upper portion 30B of fulcrum pin 30 in a direction longitudinal of the blades, while the depending portions 30A is freely movable in slot 22 longitudinally of the cutting blades 10 and 27, thereby permitting the plane of movable blade 27 to tilt toward the plane of fixed blade 10 about a laterally extending axis and the tip of movable blade 27 to be moved toward the tip of fixed blade 10. A surface of said tapped hole 25 in said fixed handle 16 engages a surface of upstanding fulcrum pin portion 30B and forms a pivot point which defines the transverse axis about which movable blade 27 can tilt (while being prevented by slot 22 and depending fulcrum pin portion 30A from rocking about the longitudinal axis of fixed blade 10) to press the blades together and to bring the tips of the blades 10 and 27 together as the blades close.

Spring 49 engaging at its ends the upstanding fulcrum pin portion 30B and the depending lever arm 38 also exerts a force on movable blade 27, tending to tilt the plane thereof about said transverse axis and toward the plane of fixed blade 10 and to press the cutting edges 11 and 28 of the movable and fixed blades together at all times. It will be appreciated that spring 49 is lengthened as the blades close, and consequently the force with which the movable and fixed blades 27 and 10 are pressed together increases progressively as the blades close. This feature provides smooth and highly efficient cutting even adjacent the tips of the blades.

Thumbscrew 50 engaged within tapped hole 25 permits adjustment of the ease with which different types of grass are cut. Turning screw 50 displaces the upstanding portion 30B of fulcrum pin 30 in an axial direction and thus moves the rear end 31 of movable blade 27 toward and away from the rear end 23 of fixed blade 10 and permits adjustment of the angle that the plane of movable blade 27 normally makes with the plane of fixed blade 10. Spring 49 maintains a constant force on the rear end of movable blade 27 tending to tilt it about an axis transverse to its longitudinal axis and to pull the tip thereof down toward the tip of the fixed blade 10, and the force exerted by spring 49 pressing the cutting edge of movable blade 27 against the cutting edge of fixed blade 10 increases as the blades close. Actuating link 42 also exerts a force on movable blade 27 tending to press it against fixed blade 10 as the blades close, and the forces exerted by spring 49 and link 42 combine to press the blades together in such a manner that the tougher the material being cut, the greater will be the pressure between the cutting edges 11 and 28 of the blades.

Referring to FIGS. 4 and 4B, it will be seen that the adjustment means 30B may be axially displaced by the rotatable cam 60, said rotatable cam being moved by the lever 61 to the position desired by the operator. This is a mechanical equivalent to the thumb screw 50 shown in FIG. 1 and is included in the clear import of the claims covering this invention.

While only a single embodiment of the invention has been illustrated and described, many modifications and variations thereof will be readily apparent to those skilled in the art, and consequently it is intended in the appended claims to cover all such modifications and variations which are within the true spirit and intent of the invention.

What I claim is:

1. A pair of shears comprising a fixed blade having a slot therein extending generally longitudinally thereof adjacent its rear end, a fixed handle rigidly secured to said fixed blade and having a portion disposed above the rear end of said fixed blade and provided with an opening therein registering with said slot, a movable blade disposed above and in cooperative cutting relation with said fixed blade and having aligned depending and upstanding fulcrum pin means rigidly affixed thereto, said depending fulcrum pin means extending into and being movable within said slot and said upstanding fulcrum pin means extending into said opening, whereby said movable blade can move relative to said fixed blade and tilt about an axis above said movable blade transverse to the longitudinal axis of said fixed blade but is prevented from rocking about the longitudinal axis of said fixed blade, a movable handle, means for pivotally mounting said movable handle on said fixed handle, means actuated by said movable handle for exerting a force against the rear end of said movable blade at a point spaced radially from said fulcrum pin means and pivoting said movable blade about said fulcrum pin means to effect cutting action of said fixed and movable blades, and resilient means for biasing said fixed and movable blades to open position.

2. A pair of shears in accordance with claim 1 wherein said fixed handle has a portion disposed above the rear end of said movable blade provided with an aperture registering with said slot and said fulcrum pin has an upstanding portion extending into said aperture and engaging the surface of said fixed handle forming said aperture and the point of engagement between said upstanding portion and said surface defines said transverse axis about which said movable blade can tilt.

3. A pair of grass shears in accordance with claim 2 and including adjustable means on said fixed handle for displacing said upstanding portion of said fulcrum pin in an axial direction toward said fixed blade, whereby the ease with which grass is cut by said shears can be varied.

4. A pair of grass shears in accordance with claim 3 wherein aid fixed handle has an internally threaded tubular portion surrounding said aperture and said upstanding portion of said fulcrum pin extends into said tubular portion and said adjustable means includes said tubular portion and a screw engaging the internal threads on said tubular portion.

5. A pair of shears in accordance with claim 1 wherein said means actuated by said movable handle member exerts a rearwardly directed pull on said movable blade tending to rotate it about said fulcrum pin means and concurrently tilt it about said transverse axis defined by a point of engagement between said upstanding fulcrum pin means and a surface of said fixed handle defining said opening and in a direction to move the cutting edge of said movable blade against the cutting edge of said fixed blade as said blades are closed.

6. A pair of shears in accordance with claim 5 wherein said movable handle is a bell crank having a depending lever arm.

7. A pair of shears in accordance with claim 6 wherein said resilient means is a spring engaging at one end said upstanding fulcrum pin means and at the other end operatively engaging said movable handle and wherein the force exerted by said spring increases as said movable handle is operated to close said blades.

8. A pair of grass shears in accordance with claims 7 and including adjustable means on said fixed handle for displacing said upstanding fulcrum pin means in an axial direction toward said fixed blade, thereby permitting adjustment of the angle that the plane of said movable blade makes with the plane of said fixed blade in the open position of said shears and the ease with which different materials are cut by said blades.

9. A pair of shears in accordance with claim 1 and including adjustable means on said fixed handle for displacing said upstanding fulcrum pin means in an axial direction toward said fixed blade, thereby permitting adjustment of the angle that the plane of said movable blade makes with the plane of the fixed blade in the open position of said shears and the ease with which different materials are cut by said blades.

10. A pair of shears in accordance with claim 9 wherein said fixed handle has an opening having internal threads and including a screw engaging said threads and permitting axial displacement of said upstanding fulcrum pin means.

11. A pair of grass shears comprising a stationary unit including a fixed handle and a fixed blade secured together; a movable blade; means secured to the movable blade for supporting said blade in adjacent relation to the fixed blade, said movable blade supporting means being movably mounted relative to the stationary unit initially to pivot said movable blade about an axis spaced from the fixed blade and extending transversely thereto so that the blades tilt against one another and cross in contacting relation at a single location on the cutting edges thereof, secondly to pivot said movable blade about axes extending generally normal to the fixed blade and through the transverse axis to move the contacting location of the blades along the blades in cutting relation, and thirdly to move with the movable blade in a direction toward and away from the fixed blade generally along a path through the transverse pivot axis so as to vary the angle of tilt of the blades against one another and accordingly the cutting characteristics of the blades; a movable handle; means pivoting the movable handle relative to the stationary unit; means connecting the movable handle and the movable blade together so that movement of the movable handle causes cutting action movement of the blades relative to one another; and means for moving the movable blades supporting means to and holding the movable blade supporting means at adjusted distances between the fixed blade and the transverse axis so as to vary the cutting characteristics of the blades and the effectiveness with which the blades cut different materials.

12. A grass shears according to claim 11, wherein the moving and holding means for the movable blade supporting means includes a cam pivoted to the stationary unit about an axis extending generally transversely of the path of movement of the movable blade supporting means that engages and forces the movable blade supporting means along said path.

13. A grass shears according to claim 11, wherein the moving and holding means for the movable blade supporting means includes a screw threaded in the stationary unit and movable along the path of movement of the movable blade supporting means and engageable with the movable blade supporting means for moving the same along said path.

References Cited
UNITED STATES PATENTS

| | | | |
|---|---|---|---|
| 2,847,760 | 8/1958 | Albertson | 30—238 |
| 2,853,777 | 9/1958 | Alofs | 30—248 |
| 3,036,379 | 5/1962 | Katzfey | 30—248 |
| 3,038,257 | 6/1962 | Caves | 30—248 |

OTHELL M. SIMPSON, *Primary Examiner.*

J. C. PETERS, *Assistant Examiner.*